United States Patent [19] [11] 4,056,511
Staniland [45] Nov. 1, 1977

[54] PROCESS FOR PREPARING AROMATIC POLYETHERS

[75] Inventor: Philip Anthony Staniland, Tewin Wood, England

[73] Assignee: Imperial Chemical Industries Limited, London, England

[21] Appl. No.: 670,156

[22] Filed: Mar. 25, 1976

[30] Foreign Application Priority Data

Mar. 25, 1975 United Kingdom ............... 12416/75
Feb. 10, 1976 United Kingdom ................. 5169/76

[51] Int. Cl.$^2$ ............................................. C08G 65/40
[52] U.S. Cl. ......................................... 260/49; 260/50
[58] Field of Search .................................. 260/49, 50

[56] References Cited

U.S. PATENT DOCUMENTS

| | | | |
|---|---|---|---|
| 3,647,751 | 3/1972 | Darsow et al. | 260/49 |
| 3,840,580 | 10/1974 | Feasey et al. | 260/463 |
| 3,886,120 | 5/1975 | Yagi et al. | 260/49 |
| 3,886,121 | 5/1975 | Yagi et al. | 260/49 |
| 3,928,295 | 12/1975 | Rose | 260/79.3 M |

Primary Examiner—Lester L. Lee
Attorney, Agent, or Firm—Cushman, Darby & Cushman

[57] ABSTRACT

Aromatic polyether ketones, polyether sulphones and etherketone/sulphone copolymers are made by heating a molar excess of a dihalogenobenzenoid compound having halogen atoms activated by ketone or sulphone groups at 250° to 400° C with dialkali metal salt of a bisphenol containing ketone or sulphone linking groups in the presence of certain diaryl sulphones to form a prepolymer and then adding an additional amount of a dialkali metal salt of a bisphenol containing ketone or sulphone linking groups and continuing polymerization.

10 Claims, No Drawings

PROCESS FOR PREPARING AROMATIC POLYETHERS

This invention relates to the manufacture of aromatic polyethers and in particular to aromatic polyethers in which the polymer chain comprises phenylene groups, oxygen atoms and ketone and/or sulphone groups. Such polymers are termed herein polyetherketones, etherketone/sulphone copolymers and polyethersulphones respectively.

Such polymers generally have high softening or melting points and are of use in applications where an article made from the polymer may be subjected to a high service temperature.

It has been proposed to make such polymers by reaction of at least one alkali metal salt of a bisphenol with an approximately equimolar proportion of at least one aromatic dihalo compound in which the halogen atoms are activated by an electron withdrawing group ortho or para thereto in the presence of a suitable polymerisation solvent. Examples of such processes are described in British patent specification Nos. 1,078,234 and 1,414,421.

In the process described in British patent specification No. 1,414,421, certain dihalo compounds are polycondensed with certain bisphenates in the presence of certain aromatic sulphone solvents. The bisphenates employed are only slightly soluble in the aromatic sulphone at the reaction temperature (and so during the polymerisation reaction are suspended or slurried in the aromatic sulphone). This process enables polymers to be made which exhibit a low absorbance when measured at a wavelength of 550 nm in a 10 mm cell using a solution of the polymer in concentrated sulphuric acid (density 1.84 g. cm$^{-3}$) containing 1 g of polymer in 100 cm$^3$ of solution (i.e. 1% w/v). This low absorbance is believed to be indicative of a low amount of branching in the polymer chain and a low absorbance is desirable as it is generally indicative of a tough polymer. In the process of British patent specification No. 1,414,421, the dihalo compound was preferably used in a slight excess, for example 0.1 to 1% molar, preferably 0.1 to 0.5% molar. It was disclosed therein that an excess of bisphenate leads to an increase in said absorbance and a polymer of low reduced viscosity, whereas more than a slight excess of dihalo compound also leads to polymer having low reduced viscosity.

We have now found that particularly good polymers may be made by this type of process by initially conducting the polymerisation using an excess of the dihalo compound and then adding more bisphenate.

According to the present invention we provide a process for the manufacture of aromatic polyethers whose molecular chains contain phenylene groups, oxygen atoms and ketone and/or sulphone groups wherein a monomer mixture comprising 1. 30 to 49.99% molar of at least one di(alkali metal) salt of a bisphenol selected from

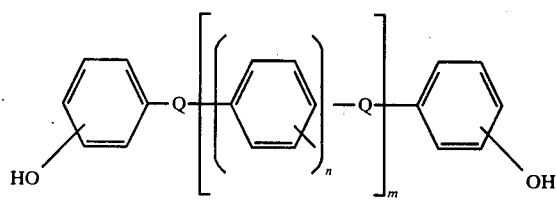

and

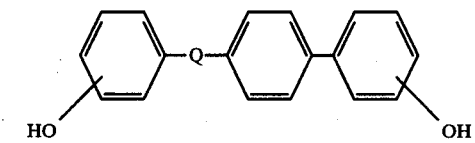

at least 95% of the phenolic OH groups being in the para position, $Q$ is —SO$_2$— or —CO—, $m$ is 0, 1, 2 or 3 and $n$ is 1, 2 or 3 and 2. correspondingly 70 to 50.01% molar of at least one dihalo compound of the formula

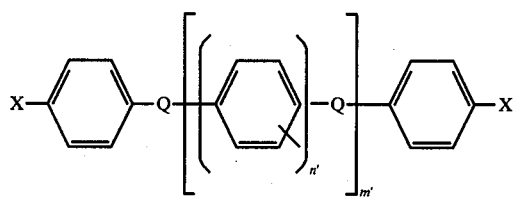

in which X is F, Cl or Br, Q is —SO$_2$— or —CO—, $m'$ = 0, 1, 2 or 3, $n'$ = 1, 2 or 3 is heated at a temperature in the range 200° to 250° C in the presence of an aromatic sulphone having the formula

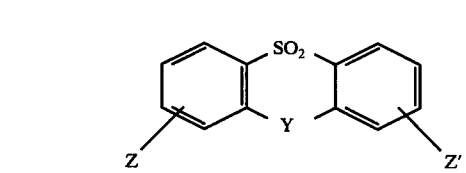

in which Y is a direct link, an oxygen atom or two hydrogen atoms (one attached to each benzene ring) and Z and Z' are selected from hydrogen atoms and phenyl groups and may be the same or different, and then, after increasing the temperature to a temperature in the range 260° to 400° C, adding, in finely divided form at least 0.01 mole, per 100 moles of said monomer mixture, of at least one dialkali metal salt of a bisphenol selected from

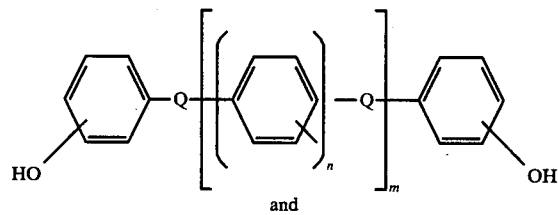

and

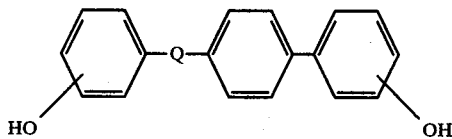

at least 95% of the phenolic OH groups being in the para position, Q is —SO$_2$— or —CO—, $m$ is 0, 1, 2 or 3 and $n$ = 1, 2 or 3 so as to bring the overall molar ratio of dihalo compound to bisphenate to within the range 51:49 to 50:50 and then continuing polymerisation.

Suitable dihalo compounds include 4,4'-dichlorobenzophenone ($X = Cl, Q = CO, m' = 0$)
4,4'-difluorobenzophenone ($X = F, Q = CO, m' = 0$)
4,4'-dichlorodiphenylsulphone ($X = Cl, Q = SO_2, m' = 0$)
1,4 (and 1,3) bis-(4-chlorobenzoyl) benzene ($X = Cl, Q = Cl, m' = n' = 1$)
4,4'-bis-(4-chlorophenylsulphonyl) biphenyl ($X = Cl, Q = SO_2, m' = 1, n' = 2$)
bis-[4-chlorophenylsulphonyl) biphenylyl] sulphone ($X = Cl, Q = SO_2, m' = 2, n' = 2$)
4,4'-bis-[4'-(4-chlorophenylsulphonyl) biphenylyl sulphonyl] biphenyl ($X = Cl, Q = SO_2, m' = 3, n' = 2$)
4,4''-bis-(4-chlorophenylsulphonyl) p-terphenyl ($X = Cl, Q = SO_2, m' = 1, n' = 3$).

Particularly preferred dihalo compounds include 4,4'-dichlorodiphenylsulphone, 4,4'-dichlorobenzophenone, 1,4-bis-(4-chlorobenzoyl) benzene and 4,4'-bis-(4-chlorophenylsulphonyl) biphenyl.

Suitable bisphenates include the dialkali metal salts of the corresponding bisphenols; i.e. the bisphenols in which the halogen atoms of the above dihalo compounds are replaced by hydroxyl groups. It is preferred however that the bisphenates are dialkali metal salts of the bisphenols of the specified formula where $m = 0$, viz

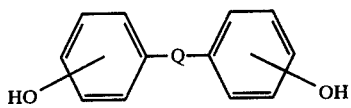

e.g. 4,4'-dihydroxydiphenylsulphone or 4,4'-dihydroxybenzophenone.

The process is of particular utility in the manufacture of (a) polyethersulphones by condensation of 4,4'-dichlorodiphenylsulphone, optionally in conjunction with 4,4'-bis-(4-chlorophenylsulphonyl) biphenyl, with a dialkali metal salt of 4,4'-dihydroxydiphenylsulphone and (b) etherketone homopolymers and etherketone/sulphone copolymers by the condensation of 4,4'-dichlorobenzophenone and/or 1,4-bis-(4-chlorobenzoyl) benzene, optionally in conjunction with 4,4'-dichlorodiphenyl sulphone, with a dialkali metal of 4,4'-dihydroxybenzophenone.

In the process of the present invention, before the addition of the further quantity of bisphenate, some polymerisation of the mixture will occur. As the polymerisation proceeds, the reduced viscosity of the polymer (as measured on a 1% w/v solution in concentrated sulphuric acid at 25° C) increases. After a certain length of time the reduced viscosity assumes a constant value indicating that no further polymerisation is taking place. The additional quantity of bisphenate is preferably added when the reduced viscosity has reached this constant value (which is largely determined by the stoichiometry of the monomer mixture). As the polymerisation ensues the power required to stir the reaction mixture increases. This provides a convenient method of following the course of the polymerisation, and, by suitable calibration, can be indicative of the reduced viscosity of the polymer. Furthermore the reduced viscosity of the polymer can quickly be assessed by taking a sample of the reaction mixture and, without isolating the polymer from the aromatic sulphone diluent, dissolving a standard weight of the sample in concentrated sulphuric acid to determine the reduced viscosity of the reaction mixture. Again a correlation can be prepared between the reaction mixture reduced viscosity and the polymer reduced viscosity.

The initial bisphenate/dihalo compound ratio and the amount of bisphenate added after reaching the polymerisation temperature are preferably such that the molar proportion of bisphenate to dihalo compound, after addition of the further amount of bisphenate, is between 49.2:50.8 and 49.9:50.1.

The additional amount of bisphenate is preferably added when the reduced viscosity of the polymer is at least 0.9.

It is surprising that the addition of the bisphenate enables high molecular weight polymers of low absorbance to be made as, at the reaction temperature, bisphenates are liable to take part in side reactions leading to branching and increased absorbance.

Furthermore, although it is necessary that the initial polymerisation should be carried out under substantially anhydrous conditions, we have found that the bisphenate added during the course of the reaction may contain water without apparent harmful effect. The bisphenate is conveniently made by the reaction of alkali metal hydroxide with the bisphenol. Thus the bisphenol may be stirred in an alkali metal hydroxide solution, in the ratio of 1 mole of bisphenol to two moles of hydroxide, until the bisphenol has dissolved, and then the water evaporated off, e.g. by spray drying, to give a hydrated bisphenate containing water of crystallisation. Thus we have found that the added bisphenate may conveniently be in this hydrated form (often containing about 5 to 10% by weight of water).

However for the preliminary part of the reaction the bisphenate should be substantially anhydrous. For this, the hydrated bisphenate initially utilised should therefore be dehydrated by removing the water for example by evaporation under reduced pressure or by heating the bisphenate in the presence of the aromatic sulphone and preferably under partial vacuum, e.g. 25 to 400 torr, at a temperature above 150° C, preferably above 200° C, but below the boiling point of the aromatic sulphone at the prevailing pressure. A particular advantage in dehydration of the bisphenate in the presence of the aromatic sulphone in the polymerisation vessel is that there is no splashing of the salt on the walls of the reaction vessel and hence stoichiometry of the polymerisation reaction is maintained because the aromatic sulphone does not boil. The dihalo component of the monomer mixture can then be added after evolution of water (as evident for example by foaming) has ceased. The temperature is subsequently increased to, or maintained at, the initial polymerisation stage temperature (in the range 200° to 250° C) and then increased to the final polymerisation temperature before addition of the further amount of bisphenate.

As stated hereinbefore, the bisphenate is only slightly soluble in the aromatic sulphone at the polymerisation temperature and so should be in a finely divided form having particle size less than 1 mm, preferably less than 500 μm.

The alkali metal in the bisphenate for use in the process of the present invention is conveniently potassium or sodium.

It is preferred that all the groups $Q$ in the bisphenate added during polymerisation are the same since bisphenates containing —CO— groups are more reactive than bisphenates containing —SO$_2$— groups. However it is not necessary that the bisphenate added during the course of the polymerisation reaction is the same as that initially present. Indeed by using dissimilar bisphenates, block copolymers may be made.

For example by using a 4,4'-dihalobenzophenone alone, or in admixture with a 4,4'-dihalodiphenylsulphone, as the dihalide and a dialkali metal salt of 4,4'-dihydroxybenzophenone as the bisphenate in the initial part of the reaction, a crystalline polyetherketone, or an etherketone/sulphone copolymer, can be formed. By suitable selection of the proportions of 4,4'-dihalodiphenylsulphone to 4,4'-dihalobenzophenone, an etherketone/sulphone copolymer that is crystalline can be formed. By using a dialkali metal salt of 4,4'-dihydroxydiphenylsulphone as the added bisphenate, a block copolymer can be formed which exhibits the properties of the polyetherketone, or etherketone/sulphone copolymer, formed in the first stage of the reaction but having a higher overall sulphone to ketone linkage ratio. As the sulphone to ketone linkage ratio of a random etherketone/sulphone copolymer increases, the copolymer becomes less crystalline and, at a sulphone linkage content of above about 40 mole %, random copolymers are amorphous.

The above technique of using a bisphenate containing sulphone links as the bisphenate added during the reaction, enable highly crystalline block copolymers to be made at overall sulphone/ketone ratios at which a random copolymer would have been less crystalline or even amorphous.

To achieve such crystalline polymers, the proportions of reactants employed in the first stage of the polymerisation reaction are preferably such that less than 25 mole % of the groups $Q$ are $-SO_2-$.

The polymerisation is preferably carried out in an inert atmosphere, e.g. argon or nitrogen. The reaction vessel can be made from glass but is preferably made from stainless steels, other than those which undergo surface crazing at the reaction temperatures in the presence of alkali metal halide, or vessels made of or lined with titanium or nickel or an alloy thereof or some similarly inert material.

The final polymerisation reaction is carried out at temperatures between 260° C and 400° C, preferably between 280° C and 350° C. As with all chemical reactions, an increase in reaction temperature leads to shorter reaction times but with attendant risk of product decomposition whereas reduction in reaction temperature leads to longer reaction times but less product decomposition. However a temperature should be used which maintains polymeric material in solution. In general the solubility of polymer in the aromatic sulphone increases with temperature and with increasing proportions of sulphone groups in the polymer chain. Accordingly polymers having a higher proportion of sulphone groups can if desired be produced at slightly lower polymerisation reaction temperatures.

In order to obtain products of low absorbance, a prepolymerisation heating stage is utilised in which monomers are heated together at 200° C to 250° C, preferably 220° C to 245° C, prior to raising the temperature to the polymerisation temperature and addition of the further amount of bisphenate. The additional bisphenate is preferably added in the form of a powder blend with the aromatic sulphone.

The preferred aromatic sulphone is diphenyl sulphone.

To neutralise any reactive oxygen-containing anions, a reagent therefore may be introduced at the termination of the polymerisation reaction. For example a reactive mono or polyfunctional halide, for example methyl chloride, bis-(4-chlorophenyl) sulphone, or 1-benzenesulphonyl-4-chlorobenzene are particularly suitable to this end. The reaction mixture may be (i) allowed to cool and solidify, (ii) ground, (iii) extracted (a) with a solvent for the diaryl sulphone, conveniently with alcohol (e.g. methanol) or acetone, and (b) with water, and finally (iv) dried.

We have found that where a reagent is added to neutralise any oxygen containing anions, and this reagent is also a dihalo compound of the class specified for use in the monomeric mixture, some of the dihalo compound may remain in the reaction vessel, e.g. as a result of sublimation, after discharge of the polymer batch therefrom and so be present in the vessel for the next polymerisation batch and hence form part of the dihalo compound employed in that next polymerisation.

Whilst etherketone homopolymers composed of units of formula

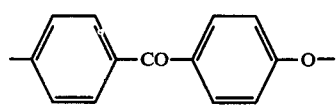

and random copolymers composed of units of formula I and units of formula

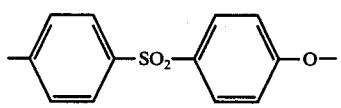

made by the process of the present invention in which up to about 25 mole % of the sulphone and ketone linkages in the polymer chain are sulphone linkages are highly crystalline, crystallinity decreases as the proportion of units (II) in the polymer chain increases. Thus a random etherketone/sulphone copolymer containing less than 10% of units (II) crystallises when quench-cooled from the melt, but those containing 10 to 25% of units (II) generally do not, and require slow cooling or annealing in order to induce crystallinity. However etherketone/sulphone copolymers have advantages over etherketone homopolymers in higher glass-rubber transition temperatures which render them more useful in applications where prolonged exposure to high temperature is anticipated.

Polymers composed of repeating units (I) and (II) preferably have an absorbance of less than 0.35 and particularly below 0.2.

Inclusion of biphenylene units, which give even better properties at elevated temperatures, into the polymer chain appears to be associated with higher absorbance preferably less than 1.0 although it may be as high as 1.5.

The polymeric materials made by the process of the present invention may be thermoformed into shaped articles by for example extrusion and moulding, e.g. compression-moulding and injection moulding. Such shaped articles include for example films, profiles, tubes, wire insulation and mouldings. The polymeric materials may be mixed with fillers such as molybdenum disulphide, carbon black, and tetrafluoroethylene polymers and copolymers, and the mixtures so formed are particularly useful in bearing applications. Shaped articles may also be fabricated using isostatic moulding techniques. Films made from the polymers may be oriented at a stretching temperature of for example 160° C to 300° C and dimensional stability of oriented film, in particular that made from polymer containing 75 to 95 mole % of units (I) and desirably 25 to 5 mole % of units (II), can be improved by heat-setting. Film, particularly heat-set film, is useful in applications where high temperatures are anticipated, for example slot liners and dielectrics (e.g. for capacitors) and electrical insulation. In particular the polymeric materials are useful as an electrical insulant for wire; in a preferred method insulation is prepared by preforming a tube of polymer and drawing the tube onto the wire. Mouldings are useful for example in switch gear, transformers, printed circuit boards, and insulators. The polymers can also be melt-spun or wet-spun (e.g. from concentrated sulphuric acid) into a fibre which can be cold drawn. A further application of the polymer is as an adhesive or coating which can be melt-formed or applied from an aqueous or non-aqueous dispersion or emulsion. For use as an adhesive or coating it is particularly preferred that the polymer contains hydroxyl end-groups. Because of the good adhesion to surfaces of other materials, the polymer may be reinforced with fillers for example glass or carbon fibre, or fibres of the polymer may be used as reinforcement for other polymeric material.

The invention is illustrated by the following Examples. Reduced viscosities were measured at 25° C in a solution of polymer in concentrated sulphuric acid (density 1.84 g/cm$^3$) containing 1 g of polymer in 100 cm$^3$ of solution. Absorbance was measured at a wavelength of 550 nm in a 10 mm cell using a solution of polymer in concentrated sulphuric acid as used for reduced viscosity.

EXAMPLE 1

The hydrated dipotassium salt of 4,4'-dihydroxy benzophenone (7.343 kg; 23.70 moles expressed as the anhydrous salt) in finely divided form (less than 500 μm) and diphenyl sulphone (14.3 kg) were charged to a reaction vessel containing about 67 g (0.233 moles) of bis-(4-chlorophenyl) sulphone from a previous polymerisation and were heated at 230° C. The pressure in the vessel was reduced and water was distilled off, thereby dehydrating the salt. The pressure was increased to atmospheric and 4,4'-dichlorobenzophenone (4.797 kg, 19.10 moles) and bis-(4-chlorophenyl) sulphone (1.371 kg, 4.78 moles) were added to the slurry and the mixture (having a molar ratio of dihalo compounds to bisphenate of 50.4:49.6) was heated at 230° C for 4 hours. The temperature was then increased and the mixture heated at 250° C for 2 hours. A sample of the reaction mixture was removed.

The temperature was then increased to 320° C. Small samples of the reaction mixture were removed after 2½, 3½ and 4½ hours for subsequent reduced viscosity and absorbance measurement.

After removing the sample at 4½ hours, finely divided hydrated dipotassium salt of 4,4'-dihydroxybenzophenone (54 g; 0.175 mole expressed as the anydrous salt) blended with powdered diphenyl sulphone (54 g) was added and the mixture maintained at 320° C for a further hour. The overall monomer mixture, after addition of the bisphenate, had a dihalo compound to bisphenate ratio of 50.2:49.8. The polymerisation was then terminated by the addition of bis-(4-chlorophenyl) sulphone (500 g).

The reaction mixture was then cooled to room temperature, milled, and then successively boiled with acetone (twice), water containing 1% by volume glacial acetic acid, water and methanol to separate the polymer from the diphenyl sulphone and potassium chloride. The polymer was then dried at 140° C for 3 hours under reduced pressure. The properties of the product and samples are shown in the table.

| Time sample removed hours after reaching 320° C | Reduced viscosity of reaction mixture | Reduced viscosity of polymer | Absorbance |
| --- | --- | --- | --- |
| 2.5 | 0.85 | 0.75 | 0.19 |
| 3.5 | | 0.82 | 0.16 |
| 4.5 | | 0.82 | 0.14 |
| 5.5 | | 0.99 | 0.16 |

It is seen therefore that addition of the bisphenate enabled the reduced viscosity of the polymer to be increased with little change in absorbance.

EXAMPLE 2

The procedure of Example 1 was repeated charging the hydrated bisphenate (7.233 kg; 23.61 moles) to a reaction vessel containing about 70 g (0.24 moles) of bis-(4-chlorophenyl) sulphone. After dehydration bis-(4-chlorophenyl) sulphone (1.356 kg; 4.72 moles) and 4,4'-dichlorobenzophenone (4.742 kg; 18.89 moles) were added. The resulting monomer mixture thus had a molar ratio of dihalo compound to bisphenate of 50.3:49.7. After heating at 230° C and 250° C as in Example 1, the mixture was heated at 320° C. At various times small samples were removed. After 4 hours at 320° C, hydrated dipotassium salt of 4,4'-dihydroxybenzophenone (60 g; 0.196 moles expressed as anydrous salt) was added as a powder blend with diphenyl sulphone (240 g). The resultant reaction mixture thus had molar ratio of dihalo compound to bisphenate of 50.1 to 49.9.

The power required to drive the stirrer motor was also noted. After a further hour at 320° C, the reaction was end stopped and the polymer worked up as in Example 1.

The properties are shown in the table.

| Time sample removed (hours after reaching 320° C) | Current required to drive stirrer (amps) | Reduced viscosity of reaction mixture | Reduced viscosity of polymer | Absorbance |
| --- | --- | --- | --- | --- |
| 2 | 3.75 | 1.35 | 1.36 | 0.22 |
| 3 | 3.80 | 1.32 | 1.37 | 0.22 |
| 4 | 3.80 | | 1.39 | 0.21 |
| 5 | 3.95 | | 1.78 | 0.24 |

EXAMPLE 3

Finely divided hydrated dipotassium salt of 4,4'-dihydroxybenzophenone (14.608 g; 0.04507 moles expressed as anydrous bisphenate) and diphenyl sulphone (27.5 g) was charged to a reaction vessel containing no dihalo compound from a previous polymerisation. After dehydration by the method described in Example 1, bis-(4-chlorophenyl) sulphone (5.2036 g; 0.01812 moles) and 4,4'-dichlorobenzophenone (18.2013 g; 0.07248 moles) were added to give a reaction mixture having a molar ratio of dihalo compound to bisphenate of 66.8:33.2. After heating at 230° C overnight under nitrogen, the temperature was raised to 320° C. After 2 hours at 320° C, a further quantity of the hydrated dipotassium salt (14.608 g; 0.04507 moles) was added as a powder blend with powdered diphenyl sulphone (27.5 g) to give a reaction mixture having a molar ratio of dihalo compound to bisphenate of 50.1:49.9. Heating was continued for 1 hour and then the polymer worked up as in Example 1. The resulting polymer had a reduced viscosity of 0.72 and an absorbance of 0.15.

I claim:

1. A process for the manufacture of aromatic polyethers whose molecular chains contain phenylene groups, oxygen atoms and ketone and/or sulphone groups comprising
   i. heating a monomer mixture consisting essentially of
      1. 30 to 49.99% molar of at least one di(alkali metal) salt of a bisphenol selected from the group consisting of

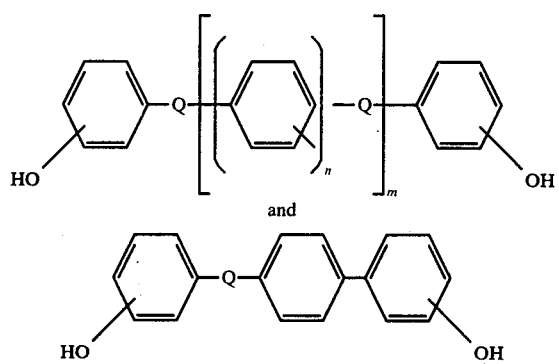

and

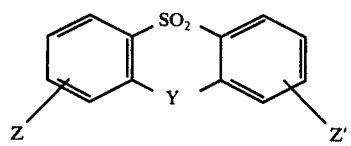

at least 95% of the phenolic OH groups being in the para position, $Q$ is —$SO_2$— or —CO—, $m$ is 0, 1, 2 or 3 and $n$ is 1, 2 or 3, and 2. correspondingly 70 to 50.01% molar of at least one dihalo compound of the formula

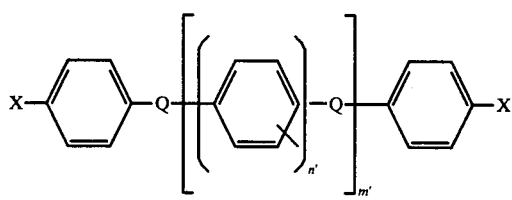

in which $X$ is F, Cl or Br, $Q$ is —$SO_2$— or —CO—, $m'$ is 0, 1, 2 or 3, and $n'$ is 1, 2 or 3, at a temperature in the range 200° to 250° C in the presence of an aromatic sulphone having the formula

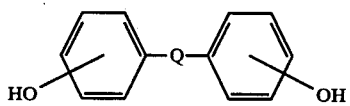

in which Y is a direct link, an oxygen atom or two hydrogen atoms (one attached to each benzene ring) and Z and Z' are selected from hydrogen atoms and phenyl groups and may be the same or different, ii. increasing the temperature to a temperature in the range 260 to 400° C and heating the mixture at that temperature, iii. after increasing the temperature to said temperature in the range 260 to 400° C, adding in finely divided form, at least 0.01 mole, per 100 moles of said monomer mixture, of at least one di(alkali metal) salt of a bisphenol selected from the group consisting of

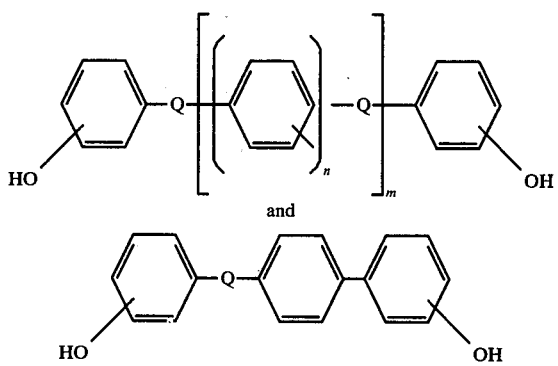

and

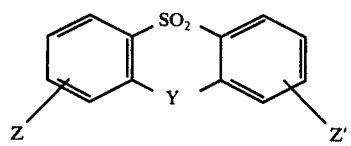

at least 95% of the phenolic OH groups being in the para position, $Q$ is —$SO_2$— or —CO—, $m$ is 0, 1, 2 or 3 and $n$ is 1, 2 or 3 so as to bring the overall molar ratio of dihalo compound to bisphenate to within the range 51:49 to 50:50 and then iv. continuing said polymerisation by said heating at the temperature within the range 260° to 400° C.

2. A process as claimed in claim 1 wherein the dihalo compound is selected from the group consisting of at least one of 4,4'-dichlorodiphenylsulphone, 4,4'-dichlorobenzophenone, 1,4-bis-(4-chlorobenzyl) benzene and 4,4'-bis-(4-chlorophenyl sulphonyl) biphenyl.

3. A process as claimed in claim 1 wherein the bisphenate is selected from the group consisting of dialkali metal salts of the bisphenols of the formula 4. A process as claimed in claim 1 wherein the monomer mixture is polymerised by heating at the temperature within the range 260° to 400° C until no further polymerisation takes place whereupon the additional quantity of bisphenate is added.

5. A process as claimed in claim 1 wherein the additional bisphenate is added when the reduced viscosity of the polymer is at least 0.9 (as measured at 25° C on a solution of the polymer in concentrated sulphuric acid containing 1 g of polymer in 100 cm³ of solution).

6. A process as claimed in claim 1 in which the initial bisphenate/dihalo compound ratio and the amount of bisphenate added after raising the temperature to a temperature in the range 260° to 400° are such that the molar proportion of bisphenate to dihalo compound, after addition of the further amount of bisphenate, is between 49.2:50.8 and 49.9:50.1.

7. A process as claimed in claim 1 in which the bisphenate added after raising the temperature to a temperature in the range 260° to 400° C is a hydrated bisphenate.

8. A process as claimed in claim 1 in which the bisphenate added after raising the temperature to a temperature in the range 260° to 400° C is the same as the initially present.

9. A process as claimed in claim 1 wherein the polymerisation reaction is terminated by addition of a dihalo compound of the class specified for use in the monomer mixture.

10. A process as claimed in claim 9 comprising
i. after termination of polymerisation, discharging the polymer batch form the polymerisation vessel, leaving some of the dihalo compound that was added to terminate polymerisation remaining in the polymerisation vessel,
ii. charging to the polymerisation vessel
   a. an aromatic sulphone having the formula

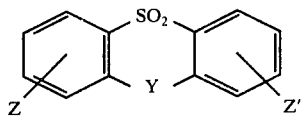

in which Y is a direct link, an oxygen atom or two hydrogen atoms (one attached to each benzene ring) and Z and Z' are selected from hydrogen atoms and phenyl groups and may be the same or different,
   b. at least one di(alkali metal) salt of a bisphenol selected from the group consisting of

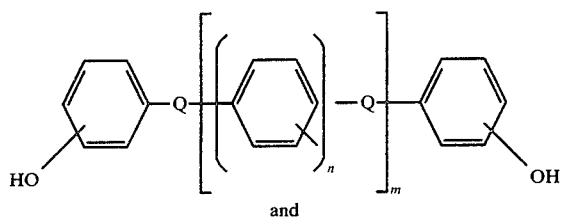

and

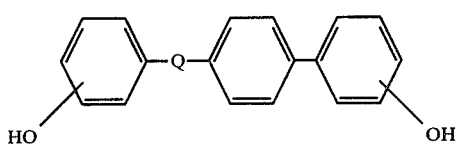

at least 95% of the phenolic OH groups being in the para position, $Q$ is —$SO_2$— or —CO—, $m$ is 0, 1, 2 or 3, and $n$ is 1, 2 or 3, and
   c. at least one dihalo compound of the formula

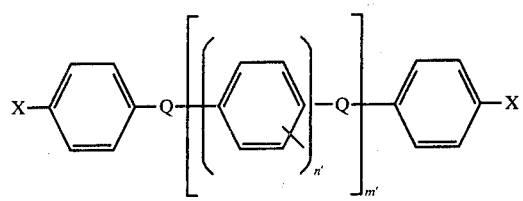

in which $X$ is F, Cl or Br, $Q$ is —$SO_2$— or —CO—, $m$ is 0, 1, 2 or 3, and $n'$ is 1, 2 or 3, the amount of said dihalo compound added, together with that remaining in the polymerisation vessel after discharge of the polymer batch, being such that there is present in the polymerisation vessel a monomer mixture consisting of 70 to 50.1% molar of dihalo compound and, correspondingly, 30 to 49.99% molar of bisphenate,
iii. heating said monomer mixture to a temperature in the range 200° to 250° C,
iv. increasing the temperature to a temperature in the range 260° to 400° C and heating the mixture at that temperature,
v. after increasing the temperature to said temperature in the range 260° to 400° C, adding, in finely divided form, at least 0.01 mole, per 100 moles of said monomer mixture, of at least one di(alkali metal) salt of a bisphenol selected from the group consisting of

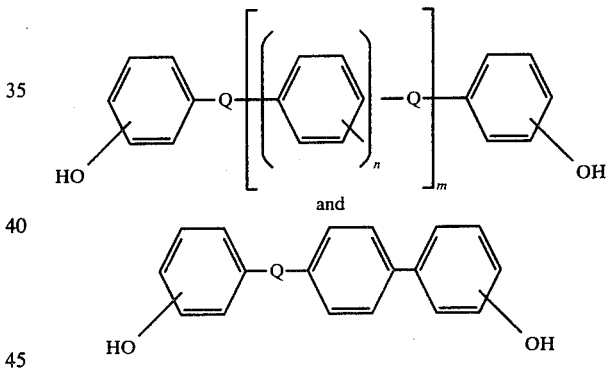

at least 95% of the phenolic OH groups being in the para position, $Q$ is —$SO_2$— or —CO—, $m$ is 0, 1, 2 or 3, $n$ is 1, 2 or 3 so as to bring the overall molar ratio of dihalo compound to bisphenate to within the range 51:49 to 50:50, and then
vi. continuing said polymerisation by heating at the temperature within the range 260° to 400° C.

* * * * *